United States Patent [19]

Mathews et al.

[11] Patent Number: 4,793,043
[45] Date of Patent: Dec. 27, 1988

[54] FUEL PUMP DISTRIBUTION ASSEMBLY SALVAGE METHOD

[75] Inventors: Will W. Mathews; Richard B. Jones, both of Germantown, Tenn.

[73] Assignee: Cummins Engine Company, Inc., Columbus, Ind.

[21] Appl. No.: 70,386

[22] Filed: Jul. 7, 1987

[51] Int. Cl.$^4$ .................................... B23P 15/00
[52] U.S. Cl. .................. 29/156.4 WL; 29/157 R; 29/402.06; 29/402.18
[58] Field of Search ............. 29/156.4 R, 156.4 WL, 29/157 R, 402.02, 402.03, 402.04, 402.06, 402.18

[56] References Cited

U.S. PATENT DOCUMENTS

| | | |
|---|---|---|
| 1,971,433 | 8/1934 | Tartrais . |
| 2,180,883 | 11/1939 | Scott . |
| 2,968,865 | 1/1961 | Rey . |
| 3,171,189 | 3/1965 | Hedgecock . |
| 3,711,310 | 1/1973 | Leeper, Jr. .................. 29/402.18 X |
| 3,888,746 | 6/1975 | Uy et al. . |
| 3,981,688 | 9/1976 | Telang et al. . |
| 4,277,292 | 10/1980 | Kipling ........................ 29/402.06 X |
| 4,285,459 | 8/1981 | Baladjanian et al. ........ 29/402.07 X |

*Primary Examiner*—Timothy V. Eley
*Attorney, Agent, or Firm*—Sixbey, Friedman, Leedom & Ferguson

[57] ABSTRACT

A method of rebuilding fuel injection pumps which have become inoperative due to excessive wear or other damage. Damaged surfaces of parts of the fuel distribution assembly, e.g., head and rotor assemblies used in rotary distributor type diesel fuel injection pumps, as well as plunger and barrel assemblies of inline diesel injection distributor pumps, are restored by a method involving disassembling of the distributor assemblies, inspecting and categorizing of damaged surface areas, machining of the parts to return them to their proper degree of roundness and surface finish with selected areas of the rotor or plunger being plated with a hard material such as chrome.

2 Claims, 3 Drawing Sheets

FUEL PUMP DISTRIBUTION ASSEMBLY SALVAGE METHOD

BACKGROUND OF THE INVENTION

1. Field of the Invention

The present invention relates to the rebuilding of fuel injection pumps which have become inoperative due to excessive wear. In particular, the invention relates to the restoring of damaged surfaces on parts of the fuel distribution assembly of such pumps, i.e., head and rotor assemblies used in rotary distributor type diesel fuel injection pumps, as well as plunger and barrel assemblies of in-line diesel injection distributor pumps.

2. Description of Related Art

Distributor type fuel injection pumps are used to deliver fuel to the injectors of the respective cylinders of an engine in sequential order. An example of such a distributor type injection pump is the DPA type distributor pump manufactured by C.A.V. Limited, Acton, London, W.3, England. With reference to FIGS. 1A, 1B, fuel injection is effected in such a pump by a single element having twin opposed plungers located within a transverse bore in a central rotating rotor member which acts as a distributor and revolves in a stationary member known as the hydraulic head. The metering pump plungers are actuated by lobes on an internal cam ring. Fuel is accurately metered to the pumping element based upon a variable fuel pressure set by a transfer supply pump carried on an opposite end of the rotor from the plungers. The high pressure charges of fuel are distributed to the engine cylinders at the required timing intervals through ports in the rotor and hydraulic head. FIG. 1A shows the charging phase and FIG. 1B the actual pumping and distribution of the metered charge. As the rotor turns, a charging port in the rotor is aligned with the metering port in the hydraulic head and fuel metered by pressure flows into the central passage in the rotor and forces the plungers apart. The amount of plunger displacement is determined by the amount of fuel which can flow into the element while the ports are aligned. The inlet port closes as rotation continues and as the single distributor port in the rotor comes into alignment with one of the distributor ports in the hydraulic head, the plungers are forced inwards, generating high pressures which cause the fuel to pass to the injector.

Because the fuel is under high pressure (3,000–10,000 psi), the rotation of the rotor, and particles may be present within the fuel despite it being passed through a fuel filter, both the rotor and hydraulic head are subject to wear in the form of scoring, pitting, and/or chipping. Similar damage can occur if the rotor siezes in the head and must be forced out. Typical types of wear and the areas at which they occur are indicated for the rotor in FIG. 2 and for the hydraulic head in FIG. 3. In view of the fact that the operating clearances between the rotor and the hydraulic head must be maintained to millionths of an inch, even light scoring can cause leakage of an extent which will effect engine operation. Thus, in accordance with manufacturer's instructions "[a] ny component showing signs of threading, wear, damage, corrosion, cracks, or distortion, must be discarded."

Another comparable pump is the "ROOSA MASTER" Model DB of Stanadyne, Inc. Its instruction manual provides inspection instructions which indicate that "[i] f damage or excessive wear is apparent, the head and rotor must be replaced as a mated unit." The common locations for wear that can lead to seizing of such pumps and the causes therefor can be found in "ROOSA MASTER" service bulletin No. 203R1, January, 1965, for example. Similar circumstances exist with respect to the rotor and head of Bosch "VE" fuel injection pumps and many others as well. Likewise, inline distributor pumps, such as Bosch "A", "B", "K" and "Z" diesel injection pumps face similar types of damage and wear problems requiring replacement of the slotted and grooved, plunger and barrel distribution assembly found in such pumps. As a result, many millions of dollars worth of worn head and rotor assemblies, as well as plunger and barrel assemblies, must be discarded each year.

The large number of such discarded worn and/or damaged head and rotor or plunger and barrel distribution assemblies would represent a valuable resource if they could be salvaged. A salvage technique used, for example, with engines and other assemblies, where one or two coacting parts is much more expensive to replace than the other, and where extremely precise matching of parts is not as critical as in the case of the above-noted type of distributor fuel pump assemblies, is to machine the damaged wear surface of one of the parts (such as the piston cylinder holes of an engine block) so as to eliminate all wear defects, and then to replace the other worn component (such as the piston heads) with a corresponding part whose diameter deviates from that of the replaced part by an amount corresponding to the change in diameter of the machined part (i.e., in the case of an engine, an oversized piston head would be used in the machined-out cylinder space of the engine block). However, in the case of distributor pump rotor and head assemblies, or plunger and barrel assemblies, no such great disparity exists between the cost of the rotor and the head, or plunger and barrel, as in the engine block and piston example. Furthermore, because of the requirement for precision matching of, for example, the rotor and head, replacement rotors and heads are only available in precision matched sets.

On the other hand, since the rotor of one set may be larger than that of another and since the degree of wear experienced by one rotor head would be different from that experienced by another, a partial salvage technique is available only to those having large numbers of worn rotor and head assemblies. That is, by mixing and matching amongst the various discarded parts, it is possible to find rotors from some assemblies which, after machining, can be matched with remachined hydraulic head assemblies of other units. Such a technique may yield a salvage rate of, perhaps, 20% salvageable parts from amongst a large number of discarded assemblies. However, since hundreds of thousands of such assemblies still must be discarded each year, even the existence of such a limited salvage technique leaves a great demand for a workable method for salvaging fuel pump head and rotor assemblies that have become so worn that they would otherwise have to be discarded.

Another technique used to decrease the number of parts which must be discarded because they have become unusable due to wear caused by dirt or friction is to increase the ability of the parts to resist wear in the first place. Thus, in patents such as U.S. Pat. Nos. 2,180,883 and 1,971,433, a liner of a hard or hardened material is welded or press fit onto cylindrical members of frictionally interengaging parts in order to increase their resistance to wear. Such wear resisting sleeves or liners have been used even in the fuel pump art, such as for the pistons of reciprocating piston pumps or the cylinders of such pumps. However, such sleeves have not been utilized in connection with rotors and hydraulic heads of distributor type fuel pumps because of the problems of securing such sleeves in place upon the rotor and/or hydraulic head with proper alignment between the various ports in the rotor and/or head with those of the corresponding sleeve. Likewise, the presence of the grooves and slots of plunger and barrel distribution assemblies have caused such techniques not to be used on in-line injection pumps, as well. Furthermore, the costs associated with such techniques would generally be considered impractically high, especially in light of the associated problems of use.

Similarly, numerous techniques for chromium plating cylindrical bearing surfaces have been used for the production of new engine block housings and piston sleeves (see, for example, U.S. Pat. Nos. 2,968,865; 3,171,189; 3,888,746; and 3,981,688) but, such techniques have not found use in the pump arts, nor are applicants aware of their having been used in the salvaging of worn parts, presumably for cost and/or feasibility reasons.

SUMMARY OF THE INVENTION

In view of the foregoing, it is a primary object of the present invention to provide a method by which distribution assemblies, such as head and rotor or plunger and barrel assemblies of distributor type fuel pumps may be salvaged in every case and in an economical manner.

It is a further object of the present invention to salvage distribution assemblies, such as rotor and hydraulic head or plunger and barrel assemblies of distributor fuel pumps via a combination of machining and electroplating techniques that results in a salvaged component that is actually improved relative to the parts in their original equipment condition.

The present invention is based upon recognition of the fact that, even though purchasers of "rebuilt" parts are looking to save money as a tradeoff relative to the so-called "quality" of new parts, and despite the fact that the added incremental cost of applying wear-reducing coatings and linings is such as to be prohibitive of their use on new equipment distributor pump distribution assemblies, the factors of low cost and improved quality no longer are incompatible when the supply of discarded worn out distributor assemblies, such as hydraulic head and rotor assemblies, is viewed as a readily available low cost resource that is not the case in the production of new equipment. That is, the rotor and head assemblies themselves need not be considered as a cost factor in evaluating the cost of rebuilding such parts back into usable condition.

In this context, applicants have developed a method for salvaging distribution assemblies, i.e., head and rotor, as well as plunger and barrel assemblies of distributor type fuel pumps wherein areas of wear and damage are removed from the rotor and hydraulic head or plunger and barrel, selected areas of the rotor or plunger are chrome electroplated, and the wear surfaces of the assembly parts are machined back into the highly precise matched relationships necessary to enable the distributor pump to once again function in its intended manner.

These and other objects, features, and advantages of the present invention will become more apparent from the following description when taken in conjunction with the accompanying drawings which show, for purposes of illustration only, a single embodiment in accordance with the present invention.

BEST MODE FOR CARRYING OUT THE INVENTION

With reference to FIGS. 2-7, the method in accordance with the present invention will, initially, be described with reference to a fuel pump distribution assembly (FIG. 4) of the type found in the above-noted DPA type distributor pump which has a rotor 1 and hydraulic head 3. At commencement of the method, the hydraulic head and rotor must be inspected, which involves removing the rotor from the hydraulic head and visually inspecting the outer diameter of the rotor and the inner diameter of the hydraulic head for defects, such as scoring, fuel pitting (erosion), rust, chipped inlet and outlet holes, etc. The extent of the wear or other damage to the various surface areas is then categorized as being either undamaged, minimally damaged, or heavily damaged.

Figure 1A:
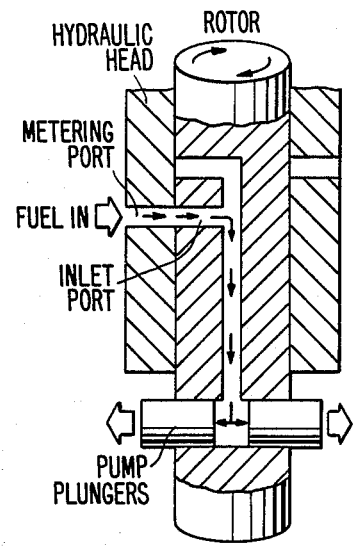
FIGS. 1A and 1B are schematic illustrations depicting the functions of pumping and distribution of metered fuel in one type of distributor type fuel injection pump to which the present invention applies.
Figure 1B:
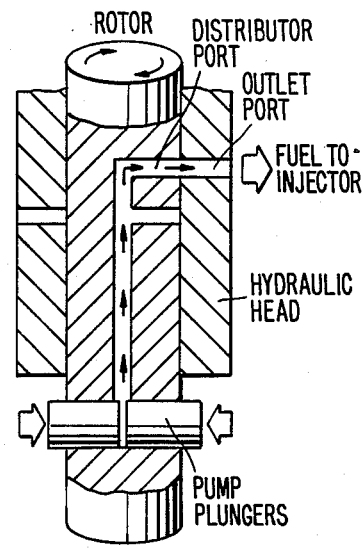
Figure 2:
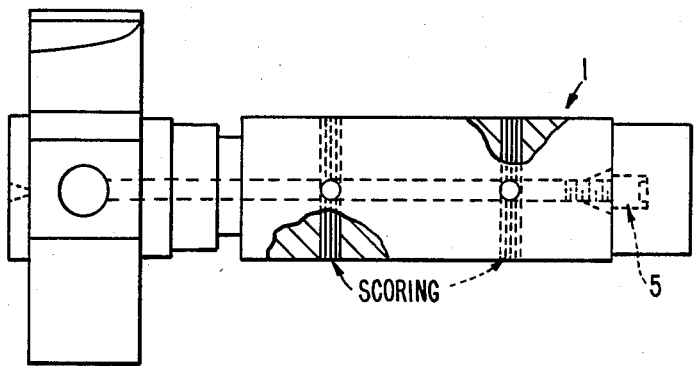
FIGS. 2 and 3 are, respectively, views of a rotor and hydraulic head depicting typical areas and types of wear.
Figure 3:
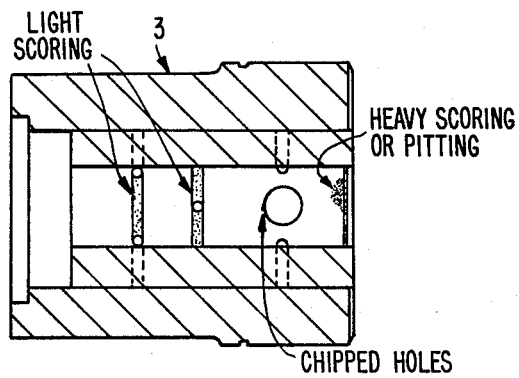
Figure 5:
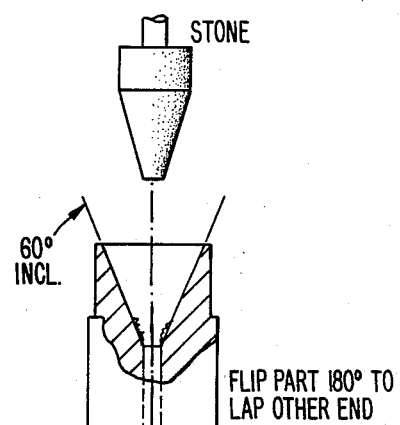
FIG. 5 depicts an initial step in the method of the present invention.
Figure 6:
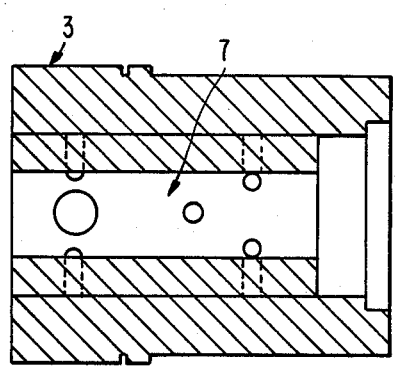
FIGS. 6 and 7 depict the rebuilt hydraulic head and rotor prior to reuniting into the FIG. 4 relationship.

For areas that have been minimally damaged, such as the light scoring shown in the hydraulic head in FIG. 3, either a lapping process using a lapping compound, or a honing process utilizing a honing stone, may be used; while, for heavier scoring, a two-stage honing process may be necessary. On the other hand, for removal of scoring, as shown in FIG. 2, from the rotor, first a lapping stone is utilized, as shown in FIG. 5, to provide lap centers on both ends of the rotor (after removal of the screw 5, FIG. 2, used to seal the transfer supply pump end of axial bore in the rotor). After removing lapping stone grit from the rotor centers, the rotor is mounted on a grinding machine and a dress wheel is used to grind the outer surface of the rotor, the dress grinding wheel being reciprocated during the grinding process. After completion of the machining step, the hydraulic head will have been returned to the precision degree of finish and dimensioning required for reuse, all damage having been removed as reflected in FIG. 6. On the other hand, the machining of the rotor 1 need not be precision matched to the hydraulic head since, after the rotor has been cleaned, further treatment of the outer diameter of the body portion thereof will be carried out as described below.

Figure 7:
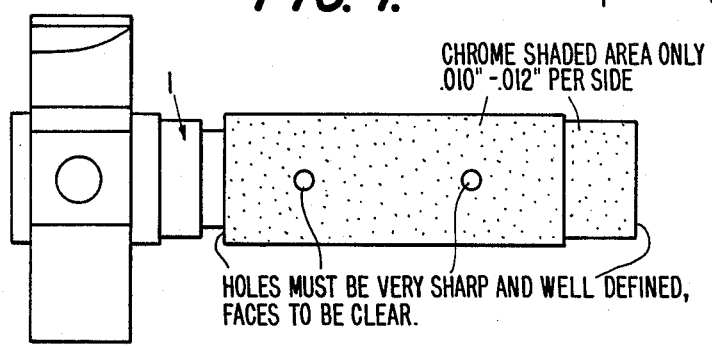
Figure 8:
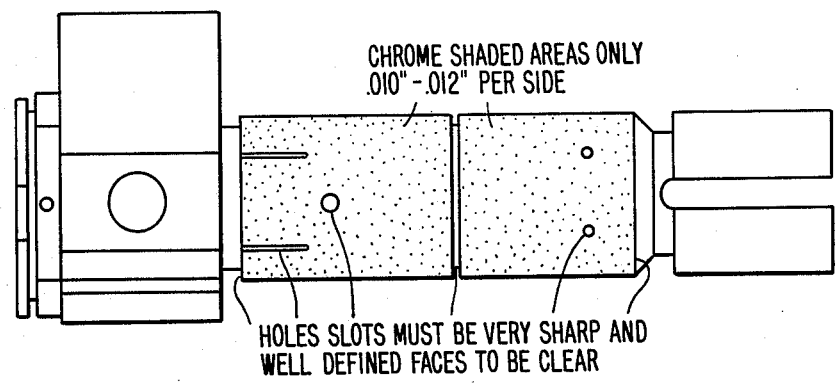
FIGS. 8 and 9 show two other types of distributor pump rotors to which the chroming step of the present invention has been applied.
Figure 9:
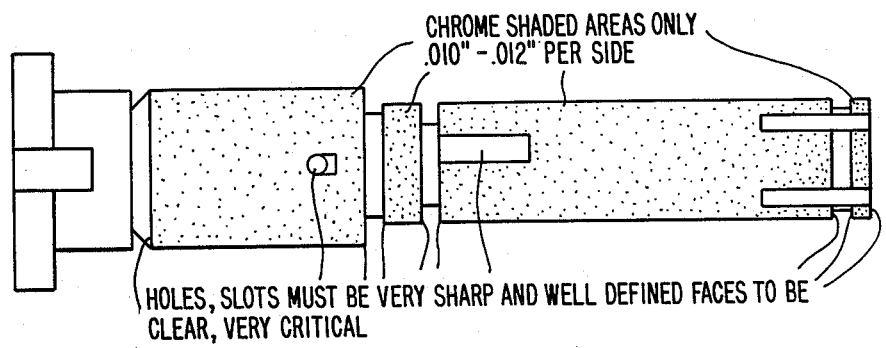

In particular, selected areas of the rotor are masked, such as with a cap applied to one or both ends of the rotor, depending upon the particular design, the unshaded areas of FIGS. 7-9 representing masked areas for C.A.V. Limited type DPA, Stanadyne "ROOSA MASTER", and Bosch "VE" rotors, respectively. Holes, recesses, or other openings in the regions to be plated need not be plugged (which is preferable with some parts), or they may be plugged or otherwise masked. After masking of selected areas of the rotor which do not constitute wear surfaces which engage against the surface of the hydraulic head defining its bore hole 7, the unmasked areas, shaded in FIGS. 7-9, are chrome plated, via known electroplating techniques, to provide a finished plating size of 0.761', the plating process being completed by baking of the rotors followed by oxiding.

After completion of the plating process, it is necessary to finish machine the rotor to precision match its outer diameter to the interior diameter of the machined bore 7 of the hydraulic head within the prescribed precision matching tolerances originally set by the manufacturer. Furthermore, this finish machining step must also encompass operations to ensure that all holes or other openings have very sharp and well defined faces that are clear of any burrs, excess plating material, or other foreign matter. Likewise, it is necessary for the end faces, indicated in FIGS. 7-9, of the respective rotors to be machined so as to be clear of all plating material. In this latter respect, it is pointed out that it may be more convenient not to mask these surfaces, but whether masked or not, since it is not possible to obtain a uniform plating of the chrome on such end face surfaces is any practical manner, the presence of plating material on these end faces can affect the balance or otherwise cause cocking of the rotor and/or rotor blades of a transfer supply pump that, for example, in the case of the DPA rotor of FIG. 7, is attached to the reduced diameter, right hand side of the rotor, and this, in turn, can lead to seizing of the rotor within the hydraulic head.

Figure 4:
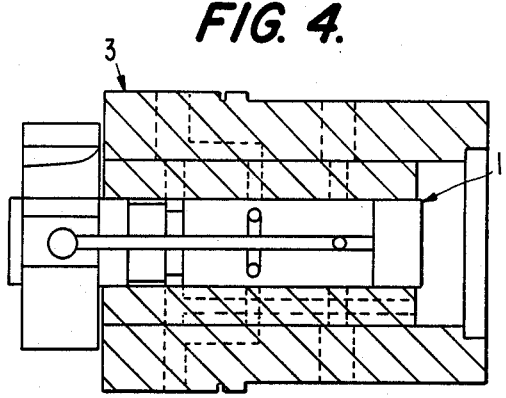
FIG. 4 illustrates a rotor and hydraulic head in their assembled condition.

After the finish machining of the rotor has been completed, the rotor is reassembled within the hydraulic head as shown in FIG. 4. Not only is the reassembled distributor assembly, comprised of the hydraulic head and rotor, as good as new, but it is actually better due to the higher wear resistance of the chrome plating of the remachined rotor, relative to the material of which the rotor is manufactured and that constituted the original wear surface thereof.

While the above-described method for salvaging distributor assemblies of injection fuel pumps has particular utility with respect to hydraulic head and rotor type distributor assemblies, as already noted, this salvage method also will find utility in the salvaging of distributor assemblies of in-line type distributor pumps which utilize a plunger and barrel type housing.

Figure 10:
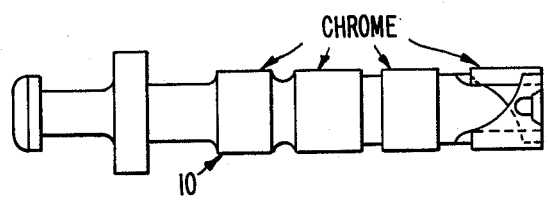
FIGS. 10 and 11, respectively, show a plunger and barrel of an in-line type distributor pump to which the method of the present invention is applicable.
Figure 11:
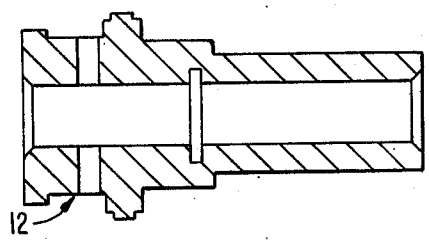

FIGS. 10 and 11, respectively, illustrate a plunger 10 and barrel housing 12, such as is found on type "A" and "MW" Bosch in-line fuel injection distributor pumps, and the plungers and barrel housings of other pumps will basically be the same. The method of salvaging such plunger and barrel housing type distributor assemblies will involve the same steps described above relative to the rotor and hydraulic head, respectively. The surface to be chrome plated are the peripheral wear surfaces shown in FIG. 10, and again, end faces should be cleared of plating material and provide a sharp edge at their junction with the peripheral, plated wear surfaces.

INDUSTRIAL APPLICABILITY

The salvaging method in accordance with the present invention will find application in connection with a large variety of various different types of distributor fuel injection pumps. One particularly important application will be for distributor type fuel injection pumps which have a rotor and hydraulic head assembly which heretofore has had to be discarded after wear or other damage has rendered the assembly unserviceable, due to problems such as leakage or seizing of the rotor relative to the hydraulic head. Furthermore, not only can hydraulic head and rotor type distributor assemblies benefit from the use of the method in accordance with the present invention, but barrel housing and plunger type assemblies of in-line distributor fuel injection pumps can also be returned for use, via the method. In either case, the rebuilt assembly will be in a condition that is better than, not merely as good as, the assembly when it was in new, original equipment condition, but at a cost that is approximately one-tenth that of purchasing a new assembly.

We claim:

1. Method of salvaging worn hydraulic head and rotor assemblies of distributor type fuel injection pumps having a hydraulic head with an axial bore and radial fuel inlet and outlet ports, and a rotor received for rotation within the bore of the hydraulic head, said rotor having a first body portion of an outer diameter that is precision matched to an interior diameter of said bore and having radial bores forming distributor and inlet ports which are directly communicable with the inlet and outlet ports of the hydraulic head and which are connected via an axial passage with a metering pump arrangement receiving area located at a second portion of said rotor that is situated outside of the bore of the hydraulic head at one end of the rotor, and a supply pump arrangement mounting area being located at a third position of said rotor at an opposite end of the rotor from the metering pump arrangement mounting area; comprising the steps of:

(A) disassembling said rotor and hydraulic head from each other and from said metering and supply pump arrangements;

(B) inspecting said rotor and hydraulic head for signs of damage such as scoring, fuel pitting, rusting, and chipping;

(C) categorizing hydraulic head surface areas as being either undamaged, minimally damaged, or heavily damaged;

(D) categorizing rotor surface areas as being either undamaged, minimally damaged, or heavily damaged;

(E) machining the hydraulic head bore and rotor surface areas in accordance with the respective damage categorization and in a manner providing a predetermined finish and dimensions within prescribed manufacturing tolerances;

(F) cleaning the hydraulic head and rotor;

(G) masking selected areas of the rotor;

(H) chrome plating unmasked areas of the rotor;

(I) finish machining the rotor to provide precision matching of the outer diameter of the body portion to the interior diameter of the machined bore of the hydraulic head within prescribed precision matching toleracnes, to ensure that all openings in the surface of the body portion are clear, sharp and well defined, and to remove any excess chrome from end faces of the rotor; and (J) reassembling said rotor within said hydraulic head.

2. Method of salvaging worn barrel housing and plunger assemblies of distributor type fuel injection pumps having a barrel housing with an axial bore and radial fuel inlet and outlet ports, and a plunger received for relative displacement within the bore of the barrel housing, said plunger having a body portion of an outer diameter that is precision matched to an interior diameter of said bore and having radially which are directly communicable with the inlet and outlet ports of the hydraulic head; comprising the steps of:

(A) disassembling said plunger and barrel housing from each other;

(B) inspecting said plunger and barrel housing for signs of damage such as scoring, fuel pitting, rusting, and chipping;

(C) categorizing barrel housing surfaces areas as being either undamaged, minimally damaged, or heavily damaged;

(D) categorizing plunger surface areas as being either undamaged, minimally damaged, or heavily damaged;

(E) machining the barrel housing bore and plunger surface areas in accordance with the respective damage categorization and in a manner providing a predetermined finish and dimensions within prescribed manufacturing tolerances;

(F) cleaning the barrel housing and plunger;

(G) masking selected areas of the plunger;

(H) chrome plating unmasked areas of the plunger;

(I) finish machining the plunger to provide precision matching of the outer diameter of the body portion to the interior diameter of the machined bore of the barrel housing within prescribed precision matching manufacturing tolerances, and to remove any excess chrome from end faces of the plunger; and (J) reassembling said plunger within said barrel housing.

* * * * *